April 14, 1959  R. F. THOMSON ET AL  2,882,190
METHOD OF FORMING A SINTERED POWDERED METAL PISTON RING
Filed July 19, 1954
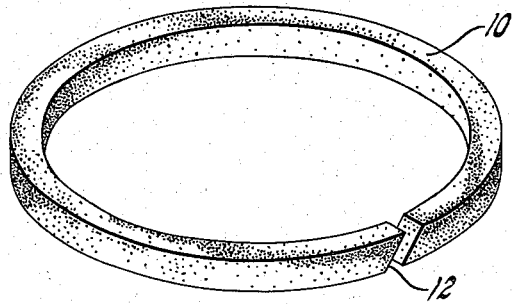
Inventors
Robert F. Thomson &
Eric W. Weinman
By
Attorney

United States Patent Office 2,882,190
Patented Apr. 14, 1959

2,882,190

METHOD OF FORMING A SINTERED POWDERED METAL PISTON RING

Robert F. Thomson, Grosse Pointe Woods, and Eric W. Weinman, Birmingham, Mich., assignors to General Motors Corporation, Detroit, Mich., a corporation of Delaware Application July 19, 1954, Serial No. 444,402

2 Claims. (Cl. 148—12)

This invention relates to sintered powdered metal piston rings containing titanium-aluminum particles and particularly to a sintered, forged and/or pressed powdered ferrous base metal piston ring characterized by high wear and score resistance.

Porous metal bearing parts have been commonly used in industry during recent years. Heretofore, however, porous metal parts have not been successfully used in piston rings because of their relatively low wear resistance. A principal object of the present invention, therefore, is to provide a novel sintered and forged or sintered and cold pressed powdered metal piston ring having good antifriction properties and a high degree of wear and score resistance due to the presence of a titanium-aluminum alloy. A further object of this invention is to eliminate the necessity of expensive chromium plating of piston rings without sacrificing wear resistance by providing a powdered ferrous base piston ring containing titanium-aluminum particles. Still a further object of the invention is to provide a simple and inexpensive process for forming a sintered, forged and/or pressed powdered metal piston ring having proper porosity.

The above and other objects are attained in accordance with our invention by a sintered and worked powdered metal piston ring having controlled porosity and high wear resistance due to the presence of dispersed particles of titanium-aluminum. Such particles are preferably introduced in the form of a pulverized intermediate alloy, as will be hereinafter explained.

Engine tests on piston rings formed in accordance with our invention indicate that the wear resistance of these rings compares favorably with that of chromium plated rings. Moreover, a sintered powdered metal piston ring of this type can be inexpensively manufactured to close dimensional tolerances because of the elimination of the expensive machining operations otherwise necessary. Since little or no machining is necessary, there is little scrap or waste.

Other objects and advantages of the present invention will more fully appear from the following detailed description of a preferred embodiment of our invention in conjunction with the accompanying drawing of a piston ring formed from a powdered ferrous metal mix containing titanium-aluminum particles.

A piston ring, such as that shown in the drawing, is preferably formed in accordance with out invention from a mixture of powdered iron containing a pulverized titanium-aluminum alloy. Even a relatively minute amount of this alloy powder improves the wear and score resistance of the piston ring to an appreciable extent and the range of this constituent may vary from a small but effective amount to a quantity constituting approximately 25% by weight of the ring. However, in order to reduce costs and to provide the piston ring with the desired strength, particularly impact strength and shock resistance, the titanium-aluminum content normally should be maintained between about 0.5% and 15%. When more than 25% powdered titanium-aluminum is used in a sintered powdered ferrous base piston ring, its strength and ductility are appreciably reduced. The excessive brittleness of such a piston ring is evidenced by chipping or cracking of wear test specimens when they are being ground. Optimum properties are usually obtained when the ring contains approximately 1.5% to 7.5% of the pulverized alloy of titanium and aluminum.

Finely divided graphite, preferably 80 mesh or finer, may be mixed with the metal powder and improves the quality of the piston ring if it is present in amounts not larger than about 4% by weight. An initial carbon content of about 0.3% to 4% is satisfactory, but to prevent loss of strength and hardness of the piston ring the graphite content should not exceed 4% in most instances. Alternately, the desired amount of carbon may be added, or the initial carbon content adjusted, by subsequent heat treatment, such as carburizing, of the piston ring. It will be understood, of course, that a measurable amount of the carbon is usually lost during the sintering operation and that it is the residual carbon which is important in determining the strength of the piston ring. Inasmuch as sintering may reduce the initial carbon content by approximately one-third, it is desirable to control the carbon additions and sintering operation so that the residual carbon content in the piston ring is between approximately 0.3% and 3% by weight. Thus, our preferred retained carbon content of about 0.6% to 1.5% normally requires the presence of between 1% and 2.3% carbon before sintering.

In view of the above considerations, we have found that a sintered powdered metal piston ring having optimum wear and score resistance properties in accordance with the present invention comprises approximately 1.5% to 7.5% by weight of titanium-aluminum alloy, 0.6% to 1.5% by weight of carbon, and the balance substantially all iron.

Among the pulverized titanium-aluminum intermediate alloys which may be used, those containing about 30% to 90% titanium and 10% to 70% aluminum result in the production of a piston ring having a satisfactory wear resistance. For best results, however, a powdered prealloy comprising between 30% and 60% aluminum and 40% to 70% titanium is preferred. If the aluminum content of the titanium-aluminum alloy is excessive, the aluminum becomes molten at the sintering temperature, and partial loss of the titanium-aluminum alloy results.

It will be noted that it is necessary to form particles of titanium-aluminum in order to obtain high wear and score resistance in accordance with the invention. Merely adding titanium and aluminum separately, even if these constituents are added in the aforementioned preferred proportions, normally does not form these particles. It is the alloy of titanium and aluminum, rather than the individual elements, which contributes the desirable properties of wear and score resistance to the sintered powdered metal piston ring. Approximately −100 to −400 mesh titanium-aluminum powder is conveniently and preferably employed. Titanium-aluminum particles which are too coarse are somewhat prone to cause scoring.

We have found that the intermediate titanium-aluminum alloy may be formed by preparing a charge of the desired percentages of titanium sponge and aluminum pig, such as commercially available 2S aluminum, the prealloy then being pulverized and added to the powdered ferrous base metal. The intermediate alloy mix may also contain small amounts of other metals, such as iron, manganese, silicon, chromium, magnesium and nickel. Normally the approximate maximum quantity of these metals will not exceed approximately 6% manganese, 3% iron, 2% silicon, 1% chromium, 1% magnesium and 0.5% nickel. When converted to percentages of the final sintered piston ring, the above manganese and silicon contents, for example, constitute on the average only about 0.9% and 0.3%, respectively. The above percentages of the minor constituents are not critical in most instances, however, and are listed as examples only.

The titanium and aluminum are preferably placed in a graphite crucible, covered, and heated to a temperature between approximately 2700° F. and 2950° F. Inasmuch as titanium is a readily oxidizable and nitridable element, it is desirable to use an inert atmosphere, such as argon, as the melting atmosphere. The formed titanium-aluminum alloy, which solidifies at about 2450° F., may be cooled to room temperature in the crucible. If the titanium-aluminum is to be poured from the crucible, this is preferably done while the temperature of the alloy is between approximately 2500° F. and 2700° F. Cooling and pouring also should take place under an inert atmosphere, the metal preferably being cast under an argon atmosphere as pigs in chilled molds.

Intermetallic compounds, such as TiAl and $TiAl_3$, are thus formed, and when pulverized and added to the ferrous base powder, greatly improve the wear resistance of the final sintered piston ring. Mixtures of these titanium-aluminum compounds frequently result, and some of the titanium and aluminum may also be present in the form of a solid solution of titanium and aluminum. Regardless of the exact form in which the titanium-aluminum particles are present in the powdered metal, their presence greatly improves the wear and score resistance of a sintered powdered ferrous base piston ring.

Among the ferrous base materials which may be successfully used are commercial iron powders, such as those made by grinding mill scale, deoxidizing, and pulverizing. A steel powder, which may be produced by atomizing very hard steel, grinding and reducing the carbon content of the powder, can also be employed. Moreover, both electrolytic iron and Swedish sponge iron powders are satisfactory base materials for wear- and score-resistant powdered iron piston rings. The particle size of the iron powder is preferably between −50 and −300 mesh.

The wear-resistant sintered powdered metal piston ring 10 may be produced by various processes. One highly satisfactory method involves briquetting the mixture of powdered iron, pulverized titanium-aluminum alloy, and graphite powder, if it is desired to add the latter, at an appropriate pressure in a ring-shaped die, thereby forming the briquette into the shape of a complete ring. A briquetting pressure of about 30,000 pounds per square inch has proved to be highly satisfactory, but pressures between approximately 20,000 and 120,000 pounds per square inch may be used. Before briquetting, it is important that the powdered metal constituents be thoroughly mixed in order to provide the resultant piston ring with uniform properties and structure.

The green briquette is then sintered under suitable conditions of time, temperature and atmosphere. Sintering temperatures between approximately 1900° F. and 2300° F. and sintering periods between one-half hour and one hour are highly satisfactory. These sintering times are not critical, however, and sintering periods as short as four minutes and as long as 90 minutes are satisfactory. Excellent results have been obtained by sintering the briquette at 2100° F. for one hour under a non-oxidizing furnace atmosphere, such as "Drycolene" gas or a gaseous mixture of "Neutralene" and a small amount of natural gas.

It is convenient to prepare "Drycolene" by burning one part of natural gas with approximately ten parts of air, condensing the water vapors, passing the gas through hot charcoal and drying it in activated alumina. The dry Drycolene gas thus is composed of approximately 20% carbon monoxide, 3% hydrogen and 77% nitrogen. The Neutralene atmosphere mentioned above is a closely related gaseous mixture which usually consists of approximately 1.5% carbon monoxide, 1.5% hydrogen and 97% nitrogen. It has proved advantageous to mix about 100 parts of Neutralene with one part of natural gas. Other furnace atmospheres can be used, of course, but Drycolene and Neutralene are readily available and each provides a highly effective protective atmosphere. Gases with high hydrogen and very low carbon monoxide contents generally are less desirable because they have a greater tendency to decarburize the briquette and are more costly.

After sintering, the strength of the piston ring blank may be appreciably increased by cold pressing or forging it in a contour-shaped annular die into the desired piston ring blank shape. The forging operation is preferably one of hot forging, and it is usually expedient to forge the briquette before it has coled after the sintering step. If desired, of course, the sintered briquette or piston ring blank may be permitted to cool and then be reheated to a temperature appropriate for forging. Forging temperatures approaching those used for sintering are generally suitable for use in the present invention. In order to obtain particular properties, however, it is permissible to cold forge or cold press the piston ring blank, but generally a hot forging operation is preferable. The forging or hot coining increases the tensile strength of the sintered blank, especially as the porosity approaches zero. Inasmuch as a dense structure permits scoring under severe engine operating conditions, it is desirable to carefully control the forging so as to provide the piston ring with proper porosity. More specifically, therefore, we have found it advisable to control forging so as to form a piston ring having between 2% and 13% porosity, thereby improving resistance to score. If the ring blank is to be cold pressed or sized rather than forged, a pressure of about 40,000 to 150,000 pounds per square inch is appropriate.

Another method of forming the wear-resistant piston ring which has been particularly satisfactory involves repeated pressing and sintering. In this multiple pressing and annealing treatment, the metal powder is first briquetted at about 30,000 to 90,000 pounds per square inch in an annular die. The briquette is next presintered at a temperature between approximately 1600° F. and 2100° F. for about 10 minutes to two hours. A presintering period of one hour at a temperature of 1600° F. to 1650° F. produces excellent results. The presintered piston ring blank is then sized or pressed at room temperature at a pressure of about 40,000 to 150,000 pounds per square inch in the same annular die and again sintered for about 15 minutes to two hours at a temperature between approximately 1900° F. and 2250° F. A one hour sintering period at 2050° F. to 2100° F. is usually preferred. Then the ring blank is again sized at room temperature at a pressure of about 40,000 to 150,000 pounds per square inch in a die which is shaped to the contour of the ring in its free and open position, the blank still being in the shape of a complete ring, however.

Following the forging or pressing operation, whichever is employed, the piston ring blank is preferably heated for about 30 to 60 minutes to a temperature between approximately 800° F. and 1100° F. with or without restraining the shape of the ring blank. This operation reduces stresses from cold pressing and tempers the martensite formed during rapid cooling of the forged blank. It also may be used to correct the shape of the ring blank if it has become distorted during hot working. Tempering for approximately 45 minutes at 900° F. has proved to be highly satisfactory. If hot forging has been used, it is desirable to rapidly die cool the blank before heat treatment.

When the heat treatment has been completed, a small segment of the piston ring blank is removed by a machining operation to produce the necessary gap 12 in the ring in its free position. After machining, the piston ring may be advantageously surface treated with an iron-manganese phosphate coating, such as that provided by the "Lubrite" treatment. Other appropriate surface treatments could be used, of course.

It will be understood that the piston ring shown and described herein may be manufactured under the usual porous metal techniques as disclosed in a number of patents, such as Patents Nos. 1,738,163, 2,097,671, 2,075,444, etc. It is likewise obvious that other powdered iron alloys, as well as powdered steel and iron, can be used as the principal constituent in the piston ring. Also, instead of briquetting the metal powder as hereinbefore explained, it may be molded to shape as suggested in Koehring Patent No. 2,198,702 in which event the forging operation, as before, is used to provide the sintered powdered metal piston ring with optimum porosity. All of these modifications are to be considered as within the scope of the present invention, which broadly comprehends the provision of a powdered ferrous base metal piston ring containing dispersed particles of a titanium-aluminum alloy.

Wear and score test apparatus were employed to compare sintered powdered piston ring materials formed in accordance with our invention with conventional cast iron piston ring materials. Each sample to be tested was machined to prepare a 1/8 inch by 1 1/8 inch rubbing surface. The specimens were next successively locked in a fixture of the wear test machine and placed in contact with a rotating smooth-surfaced cast iron wheel having a face width of one inch. Increased wear resistance was measured by decreased weight loss in grams and in decreased volume loss in cubic inches. Score resistance, on the other hand, was indicated by the load required to cause scoring under prescribed test conditions. The severity of this test is indicated by the fact that an amount of equivalent wear to that undergone in approximately 10,000 miles of engine operation occurs in an 18 1/2 hour test run period.

A wear test using this apparatus was conducted in which the specimen load was increased during the 18 1/2 hour period from zero load and automatically adjusted to produce a constant frictional load of 64 pounds. At the end of this test period the cast iron specimens showed an average weight loss of approximately 0.016 gram, while the sintered and forged powdered metal specimens containing the titanium-aluminum particles lost an average of only approximately 0.0053 gram. Similarly, while the conventional cast iron samples underwent a volume loss averaging about $140 \times 10^{-6}$ cubic inches, the specimens formed in accordance with the present invention changed on the average only $18 \times 10^{-6}$ cubic inches. The results of this test, showing the low weight and low volume loss of our new piston ring under severe wear tests, illustrate its high wear resistance. Likewise, tests indicate that our new and improved wear-resistant piston ring material has considerably better anti-friction properties than cast iron. This property was measured by means of the specimen load required to produce a 64 pound frictional load. Thus, samples formed of sintered powdered iron containing titanium-aluminum particles required an average of about 804 pounds specimen load to produce the 64 pound frictional load as compared with an average of only approximately 650 pounds specimen load when the cast iron samples were tested.

When these piston ring materials were also subjected to a score test and compared, the cast iron specimens required a load averaging only 760 pounds to produce scoring, but an average load of approximately 801 pounds was required to cause any indication of scoring of our new sintered powdered metal piston ring material.

The importance of the titanium-aluminum particles in our new sintered and worked piston ring material is apparent when the results of the above tests are compared with tests conducted on the same sintered and forged powdered iron material to which the finely pulverized intermediate alloy of titanium and aluminum had not been added. For example, the specimen load required to produce a 64 pound frictional load on the latter samples averaged only approximately 568 pounds, thus indicating that the coefficient of friction of such a material is substantially reduced by the presence of the titanium-aluminum particles. Likewise, under the aforementioned test conditions, the ordinary sintered and forged powdered iron piston ring material lost an average of 0.028 gram and underwent a reduction in volume averaging about $238 \times 10^{-6}$ cubic inches. In the score test, only a 502 pound load was required to score the specimens formed from the conventional powdered iron mix under the same conditions that required an average load of 801 pounds to cause score when the specimens containing the titanium-aluminum particles were tested.

A comparison of the results of actual engine tests on chromium plated cast iron piston rings with piston rings formed from sintered iron containing titanium-aluminum and graphite shows that top compression rings formed of the latter material lost less than one-half as much weight as similar chromium plated rings. The average weight loss of each chromium plated cast iron piston ring was 0.476 gram, while top compression rings formed of sintered powdered iron containing the titanium-aluminum alloy lost an average of only 0.230 gram per ring. A mechanical wear test period was involved in which an engine was run for 400 hours at 3600 r.p.m. at full throttle. This is equivalent to driving an automobile at 68.5 miles per hour for 23,200 miles at full throttle.

While the present invention has been described by means of certain specific examples, it is to be understood that other forms may be adopted and are contemplated as being within the scope of the present invention as set forth in the following claims.

We claim:

1. A process of forming a powdered metal piston ring characterized by high score and wear resistance, said process comprising forming a powdered ferrous base mixture consisting essentially of approximately 0.5% to 15% by weight of a pulverized titanium-aluminum alloy having a titanium content between 30% and 90% and the balance substantially all a member selected from the group consisting of iron and steel, briquetting said mixture at a pressure of about 30,000 to 90,000 pounds per square inch in an annular die, sintering said briquette at a temperature between approximately 1900° F. and 2250° F. for about 15 minutes to two hours, thereafter sizing the formed piston ring blank at room temperature at a pressure of about 40,000 to 150,000 pounds per square inch in a die which is shaped to the contour of the ring in its free and open position, and subsequently tempering said blank for approximately 30 to 60 minutes at a temperature between 800° F. and 1100° F.

2. A process of forming a powdered metal piston ring characterized by high score and wear resistance, and process comprising forming a mixture consisting of 1.5% to 7.5% by weight of a pulverized titanium-aluminum alloy having a titanium content between 30% and 90%, 0.3% to 4% by weight of graphite and the balance substantially all powdered iron, briquetting said mixture at a pressure of about 30,000 to 90,000 pounds per square inch in an annular die, presintering said briquette at a temperature between approximately 1600° F. and 2100° F. for about 10 minutes to two hours, thereafter sizing the formed piston ring blank at room temperature at a pressure of about 40,000 to 150,000 pounds per square inch in an annular die, again sintering said blank for approximately 15 minutes to two hours at a temperature between approximately 1900° F. and 2250° F., thereafter again sizing said blank at room temperature at a pressure of about 40,000 to 150,000 pounds per square inch in a die which is shaped to the contour of the ring in its free and open position, and subsequently tempering said blank for approximately 30 to 60 minutes at a temperature between 800° F. and 1100° F.

References Cited in the file of this patent

UNITED STATES PATENTS

| | | |
|---|---|---|
| 1,684,131 | Franks | Sept. 11, 1928 |
| 1,913,373 | De Golyer | June 13, 1933 |
| 2,741,827 | Koehler | Apr. 17, 1956 |

OTHER REFERENCES

Judd: "Iron-Carbon Alloys by Powder Metallurgy," in Symposium on Powder Metallurgy, London, The Iron and Steel Institute, 1947, page 120.

UNITED STATES PATENT OFFICE

CERTIFICATE OF CORRECTION

Patent No. 2,882,190                                                      April 14, 1959

Robert F. Thomson et al.

It is hereby certified that error appears in the printed specification of the above numbered patent requiring correction and that the said Letters Patent should read as corrected below.

Column 1, line 61, for "out" read -- our --; column 2, lines 15 and 16, for "Alternately" read -- Alternatively --; column 4, line 16, for "coled" read -- cooled --; column 6, line 57, for "and", second occurrence, read -- said --.

Signed and sealed this 8th day of September 1959.

(SEAL)
Attest:

KARL H. AXLINE                                                    ROBERT C. WATSON
Attesting Officer                                         Commissioner of Patents